(12) United States Patent
Ichihashi et al.

(10) Patent No.: US 6,764,310 B1
(45) Date of Patent: Jul. 20, 2004

(54) APPARATUS FOR SIMULATING RIDE ON VEHICLE

(75) Inventors: Satoru Ichihashi, Saitama-ken (JP); Masayoshi Kai, Saitama-ken (JP); Ryuichi Okamura, Saitama-ken (JP); Kunikazu Negishi, Saitama-ken (JP); Takeshi Masaki, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 546 days.

(21) Appl. No.: 09/667,727

(22) Filed: Sep. 22, 2000

(30) Foreign Application Priority Data

Sep. 24, 1999 (JP) ............................................ 11-270786

(51) Int. Cl.⁷ .............................................. G09B 19/16
(52) U.S. Cl. ...................................................... 434/61
(58) Field of Search ............................. 434/61, 62, 67, 434/55, 60, 58

(56) References Cited

U.S. PATENT DOCUMENTS

| | | | | |
|---|---|---|---|---|
| 4,478,407 A | | 10/1984 | Manabe ........................ | 272/18 |
| 5,006,072 A | * | 4/1991 | Letovsky ...................... | 434/61 |
| 5,240,417 A | * | 8/1993 | Smithson ...................... | 434/61 |
| 5,415,550 A | * | 5/1995 | Aoki ............................. | 434/61 |
| 5,533,899 A | * | 7/1996 | Young .......................... | 434/61 |
| 5,547,382 A | * | 8/1996 | Yamasaki ..................... | 434/61 |
| 6,155,833 A | * | 12/2000 | Lenihan ....................... | 434/29 |
| 6,210,165 B1 | * | 4/2001 | Sugimori ...................... | 434/61 |
| 6,234,800 B1 | * | 5/2001 | Koyama ....................... | 434/61 |

FOREIGN PATENT DOCUMENTS

| | | | | |
|---|---|---|---|---|
| JP | 07 092897 | * | 4/1995 | ............ G09B/9/58 |
| JP | 11-30950 | | 2/1999 | |

* cited by examiner

*Primary Examiner*—Kurt Fernstrom
(74) *Attorney, Agent, or Firm*—Westerman, Hattori, Daniels & Adrian, LLP

(57) ABSTRACT

An apparatus for simulating a ride on a vehicle has a base, and a simulated vehicle body which is supported on the base with a freedom of two-axis rotation about a rolling axis and a pitching axis. A pair of linear actuators are disposed in a position offset to one side in an axial direction of one of the rolling axis and the pitching axis, e.g., offset to one axial side of the rolling axis relative to the pitching axis. The actuators are disposed symmetrically relative to a plane which crosses the pitching axis at a right angle and which includes an axial line of the rolling axis. A fixing member and a movable member of each of the actuators are coupled to the base and the simulated vehicle body, respectively, through universal joints.

1 Claim, 3 Drawing Sheets ically at a right angle to the other of the first axis and the second axis and which includes an axial line of said one of the first axis and the second axis, wherein a fixing member of each of the actuators is coupled to the base, and a movable member of each of the actuators is coupled, to the simulated vehicle body respectively through universal joints.

APPARATUS FOR SIMULATING RIDE ON VEHICLE

BACKGROUND OF THE INVENTION

1. Field of the Invention

The present invention relates to an apparatus for simulating a ride on a vehicle, the apparatus having a simulated vehicle body on which a rider or an operator can ride.

2. Description of Related Art

As this kind of apparatus for simulating a ride on a vehicle, there has hitherto been known the following in Published Unexamined Japanese Patent Application No. 30950/1999. Namely, a simulated vehicle body is supported on a base with a freedom of two-axis rotation so as to be rotatable about a first axis and a second axis which crosses the first axis at a right angle. By means of a pair of linear actuators (linearly-acting actuators), a rotation about the first axis and a rotation about the second axis are given to the simulated vehicle body. In this apparatus, each of the linear actuators is disposed in a posture approximately parallel to one of the first axis and the second axis. A fixing member of each of the linear actuators is coupled to the base through a supporting shaft which is parallel to the other of the first axis and the second axis. A bell crank type of link which is rotatably supported on the base through a supporting shaft, which is parallel to the other of the first axis and the second axis, is coupled to the movable member of each of the linear actuators. This link and the simulated vehicle body are coupled together through a rod which has ball joints attached to both ends of the rod.

In the above-described conventional apparatus, there is interposed a link mechanism, which is made up of the link and the rod, between each of the linear actuators and the simulated vehicle body. Therefore, the number of parts increases and the cost becomes higher.

In view of the above points, the present invention has an object of providing a low-cost apparatus for simulating a ride on a vehicle in which a simulated vehicle body is rotatable about a first axis and a second axis by a pair of linear actuators without interposing a link mechanism therebetween.

SUMMARY OF THE INVENTION

In order to attain the above and other objects, the present invention is an apparatus for simulating a ride on a vehicle, the apparatus having: a base; and a simulated vehicle body on which a rider can ride and which is supported on the base with a freedom of two-axis rotation about a first axis and a second axis which crosses the first axis at a right angle. The apparatus comprises a pair of linear actuators disposed in a position offset to one side in an axial direction of one of the first axis and the second axis, the actuators being disposed symmetrically relative to a plane which crosses at a right angle to the other of the first axis and the second axis and which includes an axial line of said one of the first axis and the second axis, wherein a fixing member of each of the actuators is coupled to the base, and a movable member of each of the actuators is coupled, to the simulated vehicle body respectively through universal joints.

According to the present invention, when both the linear actuators are driven in the same direction, the simulated vehicle body is rotated about the other of the first axis and the second axis. On the other hand, when both the actuators are rotated in the directions which are opposite to each other, the simulated vehicle body is rotated about said one of the first shaft and the second shaft.

In this arrangement, it is necessary to give a freedom of two-axis rotation to a coupling portion between the fixing member of each of the linear actuators and the base, and to a coupling portion between the movable member of each of the linear actuators and the simulated vehicle body, respectively, the rotation being about an axis which is parallel to said one of the axes and about an axis which is parallel to the other of the axes. This freedom of movement can be given by universal joints. In this manner, by means of the pair of the linear actuators, the simulated vehicle body can be rotated about the first axis and the second axis without interposing a link mechanism therebetween.

In an apparatus for simulating a ride on a vehicle in which the simulated vehicle body is for a motorcycle, the first axis and the second axis are constituted respectively by a rolling axis which is elongated in a longitudinal direction of the simulated vehicle body and a pitching axis which is elongated in a lateral direction of the simulated vehicle body. In this case, preferably, the pair of actuators are disposed in a position offset to a forward side in an axial direction of the rolling axis relative to the pitching axis in a manner symmetrical relative to a plane which crosses the pitching axis at a right angle and which includes an axial line of the rolling axis. The movable member of each of the actuators is coupled to a front lower portion of the simulated vehicle body. Then, the linear actuators can be covered by a front cowl which is to be mounted on a front end portion of the simulated vehicle body. The aesthetic appearance of the apparatus can thus be improved. In addition, a wider space can be secured below both lateral sides in a central portion of the simulated vehicle body, thereby attaining an appropriate construction as an apparatus for use as simulating a ride on a motorcycle.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
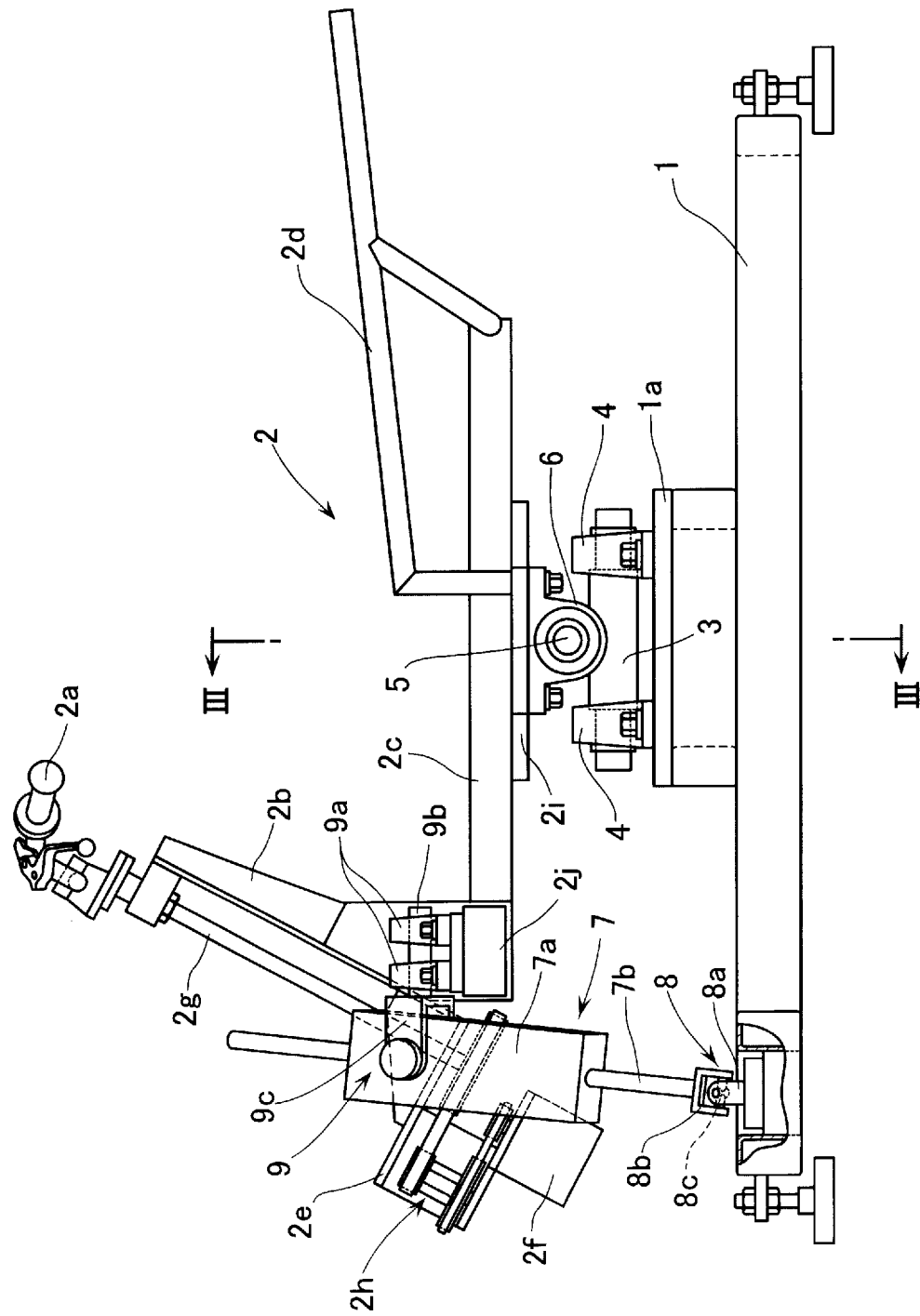
FIG. 1 is a side view of one example of an apparatus for simulating a ride on a vehicle of the present invention.
Figure 2:
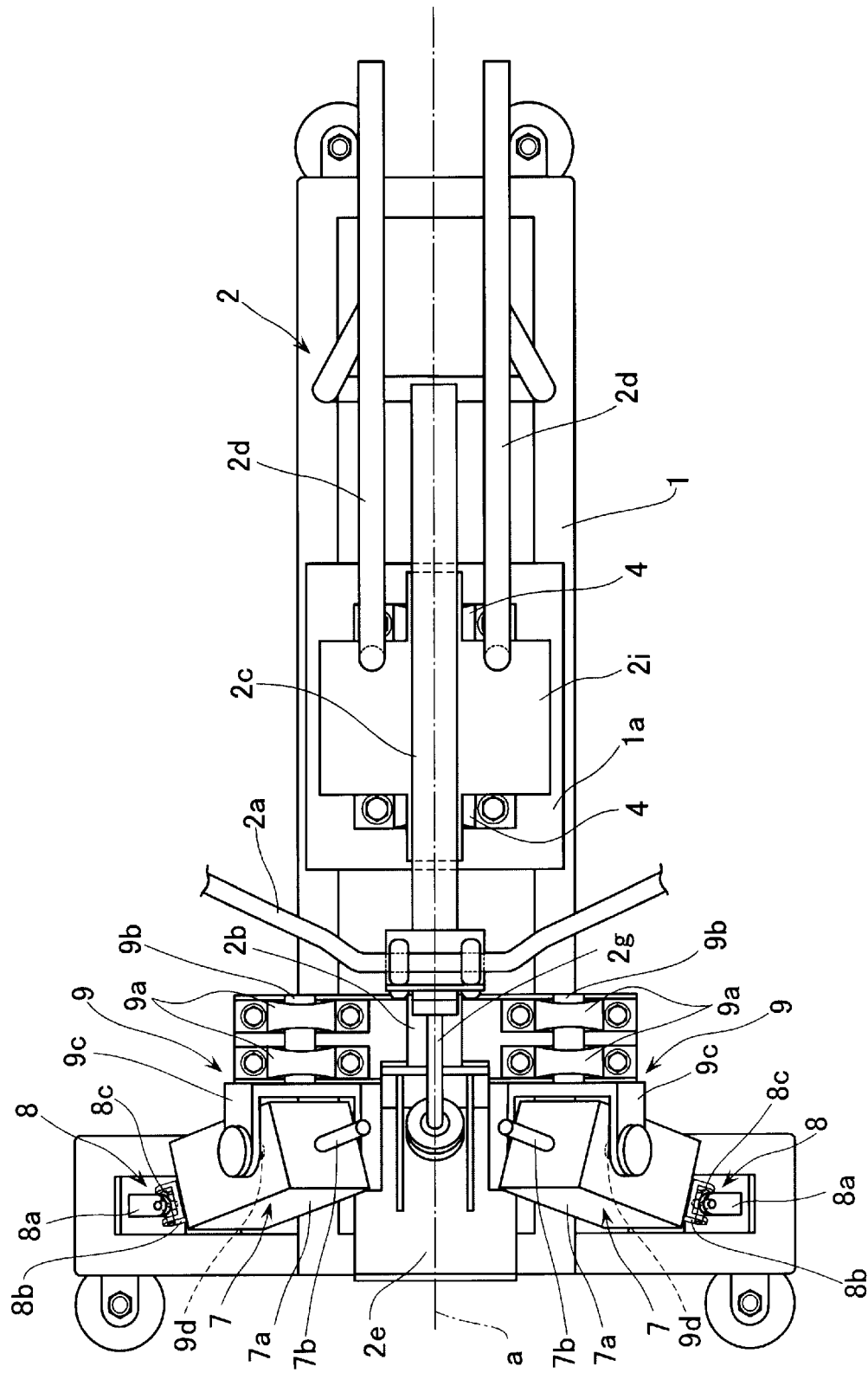
FIG. 2 is a plan view of the apparatus shown in FIG. 1.

FIGS. 1 and 2 represent an apparatus for simulating a ride on a motorcycle. This apparatus is provided with a base 1 and a simulated vehicle body 2 which is supported on the base 1 with a freedom of two-axis rotation which is described in more detail hereinbelow.

The simulated vehicle body 2 is provided with: a front column 2b having at an upper end thereof a handle 2a for steering the simulated vehicle body 2; a main frame 2c which is elongated backwards from a lower end of the front column 2b; and a rear frame 2d which is provided on a rear upper portion of the main frame 2c. It is thus so arranged that a rider or an operator of the apparatus can sit or ride on a seat (not illustrated) which is to be mounted on the rear frame 2d. The front column 2b is further provided at a lower end thereof with a supporting frame 2e which protrudes forward. An electric motor 2f is mounted on the supporting frame 2e. The electric motor 2f is coupled through a reduction (speed reducing) mechanism 2h to a steering shaft 2g which extends from the handle 2a. It is thus so arranged that a steering load corresponding to an operating state is given to the handle 2a.

Figure 3:
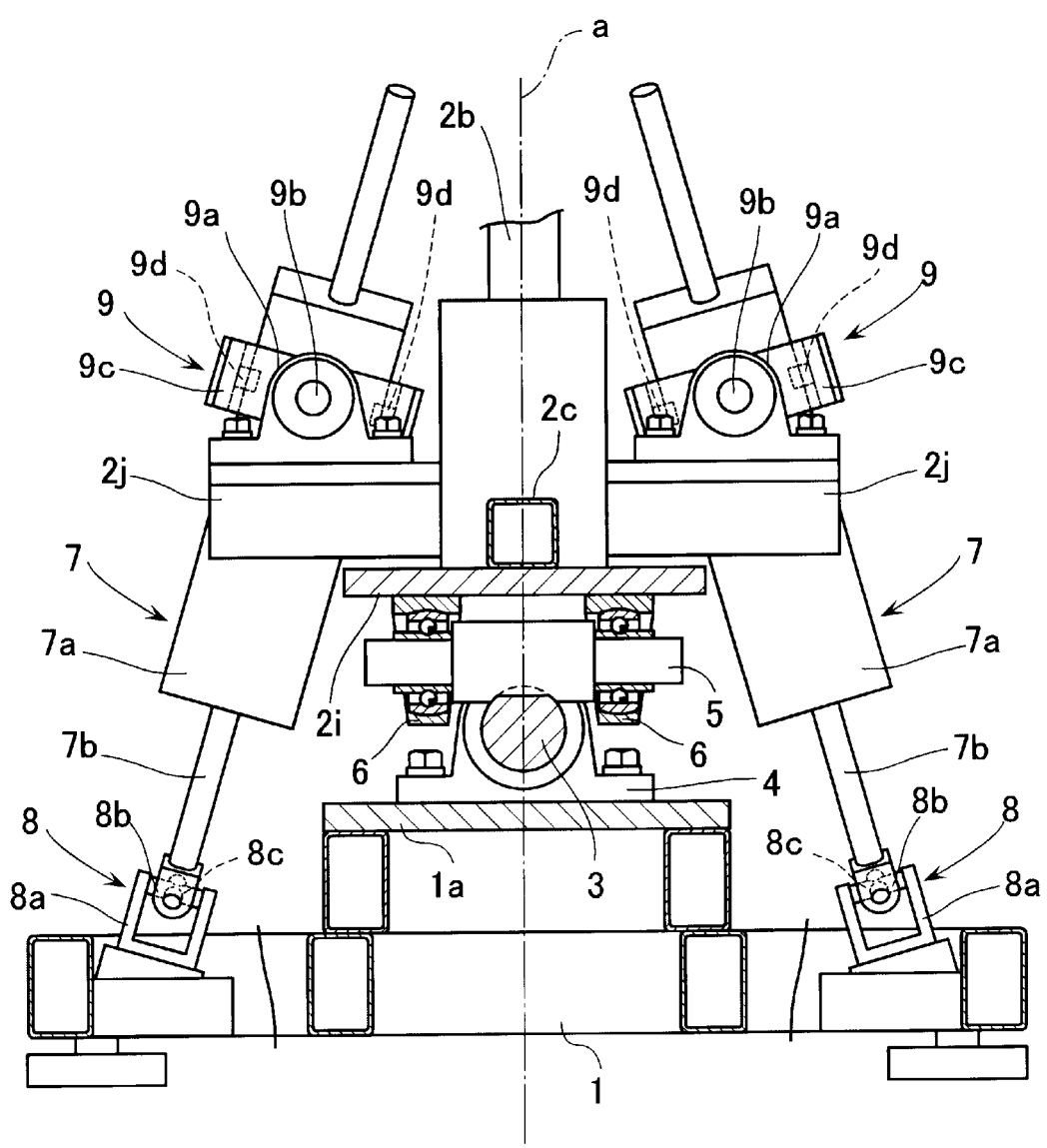
FIG. 3 is a sectional view taken along the line III-III in FIG. 1.

The base 1 has fixed thereto a supporting base 1a for supporting thereon the simulated vehicle body 2. On this supporting base 1a, there is rotatably supported a rolling axis (rolling shaft) 3 through a pair of bearings 4, 4. The rolling axis 3 is elongated in a back and forth direction (i.e., a longitudinal direction of the simulated vehicle body 2), the rolling axis being defined as a first axis. As shown in FIG. 3, a pitching axis (pitching shaft) 5, defined as a second axis, which crosses the rolling axis 3 at a right angle and which is elongated in a lateral direction (i.e., a widthwise direction of the simulated vehicle body 2) is fixed to an upper surface of the rolling axis 3. A supporting plate 2i is fixed to a lower surface of the main frame 2c of the simulated vehicle body 2. The simulated vehicle body 2 is rotatably supported by a pair of bearings 6, 6 which are mounted on the lower surface of the supporting plate 2i. The simulated vehicle body 2 is thus given a freedom of two-axis rotation about the rolling axis 3 and the pitching axis 5.

In the apparatus for simulating a ride on a motorcycle, there are disposed a pair of left and right linear actuators 7, 7 in a position offset, relative to the pitching axis 5, to one side (forward in this embodiment) in the axial direction of the rolling axis 3, the actuators 7, 7 being disposed symmetrically relative to a plane "a" which crosses the pitching axis 5 at a right angle and which includes the axial line of the rolling axis 3.

Each of the linear actuators 7, 7 is provided with a casing 7a for containing therein an electric motor (not illustrated), and a screw rod 7b which is inserted through the casing 7a. A nut for engaging with the screw rod 7b in a screwed manner is supported in a rotatable manner inside the casing 7a. By rotating the nut by the electric motor, the screw rod 7b and the casing 7a move in the axial direction of the screw rod 7b relative to each other. This linear actuator 7 is known as an actuator which is used for an electrically operated power steering mechanism.

The lower end portion of the screw rod 7b of each of the linear actuators 7, 7 is coupled to the base 1 through a first universal joint 8. The casing 7a of each of the linear actuators 7, 7 is coupled to the simulated vehicle body 2 through a second universal joint 9.

The first universal joint 8 is constituted into a Hook's universal shaft coupling which is made by coupling a lower yoke fixed to the base 1 to an upper yoke 8b fixed to the screw rod 7b through a cross-shaped member 8c. The second universal joint 9 is provided with a fork-shaped member 9c which is rotatably supported, through a longitudinally elongated shaft 9b, by bearings 9a on each of brackets 2j, 2j which are disposed so as to project laterally outward on both lower sides of the front column 2b of the simulated vehicle body 2. In a state in which the casing 7a is inserted into the forked portion of the fork-shaped member 9c, the fork-shaped member 9c is pivotally attached to the casing 7a through shafts 9d which cross the shaft 9b at a right angle. In this manner, the freedom of two-axis rotation is given respectively to the coupling portion between the screw rod 7b and the base 1, and to the coupling portion between the casing 7a and the simulated vehicle body 2. The screw rod 7b and the casing 7a are thus tiltable in an arbitrary direction relative to the simulated vehicle body 2.

According to the above-described arrangement, when the pair of linear actuators 7, 7 are both moved upward or downward, the simulated vehicle body 2 is subjected to a downward (with the head down) or upward (with the head up) rotary movement with the pitching axis 5 serving as a fulcrum, i.e., it is subjected to a pitching movement. When the casings 7a, 7a of both the linear actuators 7, 7 are moved to vertical directions which are opposite to each other, the simulated vehicle body 2 is subjected to a lateral or horizontal rotary movement with the rolling axis 3 serving as a fulcrum, i.e., is subjected to a rolling movement. In this manner, by giving the simulated vehicle body 2 a pitching movement depending on the operation of the accelerator and the operation of the brake by the rider, as well as by giving the simulated vehicle body 2 a rolling movement depending on the movement (or transfer) of the weight of the rider himself, it becomes possible for the rider to physically experience or feel the vehicle body movement as if he were actually riding on a motorcycle.

In the above-described embodiment, the pair of linear actuators 7, 7 are disposed in an erected posture near the front column 2b of the simulated vehicle body 2. Therefore, the linear actuators 7, 7 can be covered by a front cowl (not illustrated) which is to be mounted on the front column 2b of the simulated vehicle body 2. This brings about an aesthetically improved appearance of the apparatus for simulating a ride. In addition, a wider open space can be secured below a central portion on each lateral side of the simulated vehicle body, thereby attaining an appropriate construction as an apparatus for simulating a ride on a motorcycle.

In the above-described embodiment, the screw rod 7b of the linear actuator 7 is fixed as a stationary member to the base 1, and the casing 7a is coupled as the movable member to the simulated vehicle body 2. Alternatively, the casing 7a may be constituted as the stationary member to be coupled to the base 1, and the screw rod 7b may be coupled, as the movable member, to the simulated vehicle body 2. In addition, the linear actuators 7, 7 are not limited to the electrically operated ones as described above, but they may be constituted into a fluid pressure type using cylinders.

Further, when the apparatus for simulating a ride is for a motor vehicle and in which the simulated vehicle body is supported on a base with a freedom of two-axis rotation about a vertical yawing axis and a lateral pitching axis, the following arrangement may be employed. Namely, in a position offset in an axial direction of one of the yawing axis and the pitching axis, e.g., in a position downward along the yawing axis which is defined as one side in the axial direction of the yawing shaft relative to the pitching shaft, a pair of linear actuators are disposed symmetrically relative to a plane which crosses the pitching axis at a right angle and which includes the axial line of the yawing axis. The fixing member and the movable member of each of the linear actuators are coupled to the base and the simulated vehicle body, respectively, through universal joints. According to this arrangement, when both the linear actuators are driven in the same direction, the simulated vehicle body is subjected to a pitching movement about the pitching axis. When both the linear actuators are driven in directions which are opposite to each other, the simulated vehicle body is subjected to a yawing movement.

As can be seen from the above explanations, according to the present invention, the simulated vehicle body can be rotated by a pair of linear actuators about each of the first axis and the second axis without using a link mechanism. The number of parts can thus be reduced, resulting in a cost reduction.

It is readily apparent that the above-described apparatus for simulating a ride on a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for simulating a ride on a vehicle in a form of a motorcycle, said apparatus having;
   a base; and
   a simulated vehicle body on which a rider can ride and which is supported on said base with a freedom of two-axis rotation about a rolling axis which is elongated in a longitudinal direction of said simulated vehicle body and a pitching axis which is elongated in a lateral direction of said simulated vehicle body, said simulated vehicle body comprising a front column which has mounted on an upper end thereof a handle for steering said simulated vehicle body, said apparatus comprising:
   a pair of linear actuators disposed in an erected posture in a position offset, relative to the pitching axis, toward said front column which lies on a front side in an axial direction of the rolling axis, said actuators being disposed symmetrically relative to a plane which crosses at a right angle to the pitching axis and which includes an axial line of the rolling axis,
   wherein a fixing member of each of said actuators is coupled to said base, and a movable member of each of said actuators is coupled to a lower portion of the front column respectively through universal joints.

* * * * *